United States Patent
Doll et al.

(10) Patent No.: US 11,186,802 B2
(45) Date of Patent: Nov. 30, 2021

(54) PROCESS FOR THE DECARBOXYLATION, ISOMERIZATION, HYDROGENATION, DEHYDROGENATION AND CYCLIZATION AROMATIZATION OF FATTY ACIDS YIELDING PRODUCTS WITH SIGNIFICANT AROMATIC CONTENT

(71) Applicant: The United States of America, as represented by the Secretary of Agriculture, Washington, DC (US)

(72) Inventors: Kenneth M. Doll, Peoria, IL (US); Bryan R. Moser, Morton, IL (US); Gerhard H. Knothe, Peoria, IL (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 0 days.

(21) Appl. No.: 16/918,187

(22) Filed: Jul. 1, 2020

(65) Prior Publication Data
US 2021/0032565 A1     Feb. 4, 2021

Related U.S. Application Data

(60) Provisional application No. 62/879,744, filed on Jul. 29, 2019.

(51) Int. Cl.
| | | |
|---|---|---|
| *C11C 3/12* | (2006.01) | |
| *C11C 3/14* | (2006.01) | |
| *B01J 23/46* | (2006.01) | |
| *B01J 31/22* | (2006.01) | |

(52) U.S. Cl.
CPC ............. *C11C 3/126* (2013.01); *B01J 23/462* (2013.01); *B01J 31/2295* (2013.01); *C11C 3/14* (2013.01); *B01J 2531/827* (2013.01)

(58) Field of Classification Search
CPC . C11C 3/126; C11C 3/14; B01J 23/462; B01J 31/2295
USPC ........................................................ 554/146
See application file for complete search history.

(56) References Cited

U.S. PATENT DOCUMENTS 9,868,679 B2    1/2018    Murray et al.

OTHER PUBLICATIONS

Vasquez et al., 2017, "Hydrotreatment of vegetable oils: A review of the technologies and its developments for jet biofuel production," Biomass and Bioenergy 105, pp. 197-206.

*Primary Examiner* — Deborah D Carr

(74) *Attorney, Agent, or Firm* — John D. Fado; G. Byron Stover

(57) ABSTRACT

Disclosed herein are processes for the decarboxylation, isomerization, hydrogenation, dehydrogenation, and cyclization/aromatization of fatty acids involving contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein the catalyst is chloro-1,5-cyclooctadiene iridium (I) dimer. The product may contain at least about 8% by volume aromatic content and less than about 25% by volume aromatic content, and wherein the product contains less than about 1% by volume of naphthalenes.

7 Claims, 5 Drawing Sheets

PROCESS FOR THE DECARBOXYLATION, ISOMERIZATION, HYDROGENATION, DEHYDROGENATION AND CYCLIZATION AROMATIZATION OF FATTY ACIDS YIELDING PRODUCTS WITH SIGNIFICANT AROMATIC CONTENT

REFERENCE TO RELATED APPLICATION

This application claims the benefit of U.S. Provisional Application No. 62/879,744 filed 29 Jul. 2019, which is incorporated herein by reference in their entirety.

BACKGROUND OF THE INVENTION

Disclosed herein are processes for the decarboxylation, isomerization, hydrogenation, dehydrogenation, and cyclization/aromatization of fatty acids involving contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein the catalyst is chloro-1,5-cyclooctadiene iridium (I) dimer. The product may contain at least about 8% by volume aromatic content and less than about 25% by volume aromatic content, and wherein the product contains less than about 1% by volume of naphthalenes.

The use of natural oils as feedstocks for various industries has been a topic of high interest in recent decades (Biermann, U., et al., Angewandte Chemie—International Edition, 50: 3854-3871 (2011)). The formation of many polymer feedstocks, or hydrocarbon fuels, from natural oils requires the removal of oxygen from the stating material which has been performed by several different methods dating back 70 years (Meier, M. A. R., et al., Chemical Society Reviews, 36: 1788-1802 (2007); Kraus, G. A., and S. Riley, Synthesis, 44: 3003-3005 (2012); Kraus, G. A., U.S. Pat. No. 8,629,312 (2013); Dupont, J., et al., Energy and Environmental Science, 2: 1258-1265 (2009); Tran, N. H., et al., Fuel, 89: 265-274 (2010); Santillan-Jimenez, E., and M. Crocker, Journal of Chemical Technology and Biotechnology, 87: 1041-1050 (2012); Popov, S., and S. Kumar, Energy and Fuels, 29: 3377-3384 (2015); Chang, C.-C., and S.-W. Wan, Industrial & Engineering Chemistry, 39: 1543-1548 (1947)).

One of the most promising recent developments in this area was a decarboxylation reaction based on ruthenium (Ru) and/or osmium (Os) catalysis (Murray, R. E., et al., ACS Catalysis, 4: 3517-3520 (2014); Murray, R. E., et al., U.S. Pat. No. 9,868,679 (2018), U.S. Pat. No. 10,457,615 (2019). This process, building on Ru carbonyl carboxylates described earlier, was most effective on mono-unsaturated carboxylic acid substrates (Crooks, G. R., et al., Journal of the Chemical Society A, 2761-2766 (1969); Salvini, A., et al., Journal of Molecular Catalysis A: Chemical, 159: 185-195 (2000)). It first isomerizes the double bond then facilitates a decarboxylation reaction yielding carbon dioxide and an alkene which is one carbon smaller than the original carboxylic acid (which also occurs in our process described herein). The isomerization aspect of the process also improved the properties of a lubricant additive, but the decarboxylation aspect is considered most useful for synthesis of polymer additives and fuels (Doll, K. M., et al., Chemical Engineering Communications, 203: 901-907 (2016)).

The fuel properties of the biobased fuel were specifically studied in preliminary reports followed by a more detailed study (Moser, B. R., et al., Energy & Fuels, 30: 7443-7451 (2016); Doll, K. M., et al., Industrial & Engineering Chemistry Research, 56: 864-871 (2017); Knothe, G., et al., ACS Omega, 2: 6473-6480 (2017)). The decarboxylation of 9-cis-octadecenoic acid gave an ~75% yield of hexadecene isomers along with about 20% saturated hexadecane and a small amount (about 6%) of aromatic components (Moser et al. 2016). Furthermore, this fuel mixture was blended with petroleum diesel fuel and the relevant properties were measured.

The aromatic products of this minor reaction are of interest to our current work. The synthesis of synthetic hydrocarbons suitable for jet fuel has been an especially high-profile research topic in recent years (Vasquez, M. C., et al., Biomass and Bioenergy, 105: 197-206 (2017)). Although significant progress has been made, the ideal content of aromatics is an important variable in jet fuel. Aromatics are beneficial because they alter fuel density and, more importantly, they are proven to reduce shrinkage in elastomeric seals and reduce seal failure. However, if the content of aromatics is too high, these same seals will over-soften, which may also result in failure. A minimum aromatic content of 8% by volume is needed in jet fuels for density and seal shrinkage issues, and a maximum limit of 25% is needed to maintain other desirable fuel properties, with a further requirement that naphthalenes be restricted to only 3% (ASTMD1665-12).

Conventionally produced petrochemically based jet fuels contain approximately 16% aromatics, which limits the blending ratio of any non-aromatic containing component to 50%. This effectively caps the amount of bio-based fuels made via the earlier process that can be blended with conventional jet fuel.

To form the desired cyclic aromatic components from 9-cis-octadecenoic acid, we found that the substrate must be dehydrogenated somewhere as the reaction proceeds (Scheme 1):

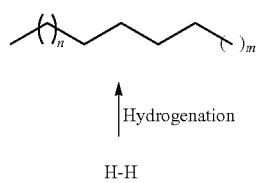

H-H

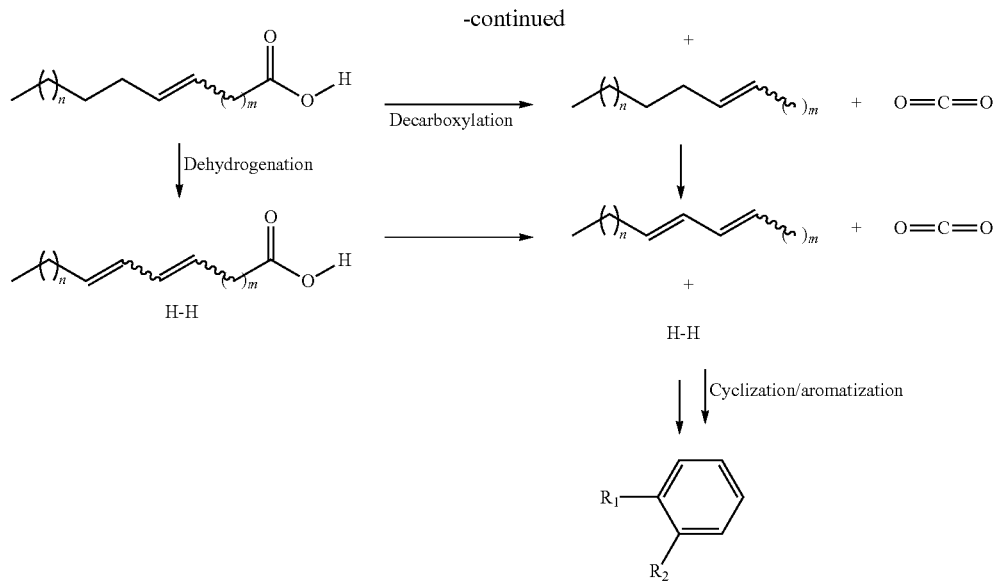

While Ru is strongly active in metathesis, decarboxylation and isomerization catalysis, it is not considered highly active for hydrogenation, dehydrogenation, aromatization or cyclizations that do not involve metathesis reactions. We hypothesized that combining a different metal with Ru, or using a different metal instead of Ru, could change the relative rates of the reactions, thereby surprisingly giving different final products. We selected iridium (Ir) to increase production of aromatic products.

Herein we compare Ir to the Ru catalyzed decarboxylation of 9-cis-octadecenoic (oleic) acid with a specific focus on the production of aromatic components important for jet fuel. We discovered a specific Ir catalyst was surprisingly capable of performing both the aromatization reaction and the decarboxylation and isomerization reactions, even without the presence of Ru, a previously unreported finding. The Ru and Ir systems are compared herein, with the main difference surprisingly being in the relative production of aromatic compounds, and the finding that the decarboxylation technology disclosed herein can produce fuel with aromatic contents greater than about 8% (e g., greater than 8%). In other words, these renewable fuels can surprisingly be blended with conventional jet fuel in any proportion and retain sufficient aromatics in the fuel. Another consideration for fuel producers is the content of napthalenes. If the content is too high, poor emissions can result, hence they are limited to 3%. They are also not desirable in fuel due to slightly lower energy content. Additionally, in this technology, surprisingly no napthalenes were detected, with a detection limit of 1%, in the bio-based fuel produced by this technology, thereby avoiding that restriction as well. Similar surprising results were obtained when, instead of pure oleic acid, a fatty acid mixture from high oleic soybean oil was used.

SUMMARY OF THE INVENTION

Disclosed herein are processes for the decarboxylation, isomerization, hydrogenation, dehydrogenation, and cyclization/aromatization of fatty acids involving contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein the catalyst is chloro-1,5-cyclooctadiene iridium (I) dimer. The product may contain at least about 8% by volume aromatic content and less than about 25% by volume aromatic content, and wherein the product contains less than about 1% by volume of naphthalenes.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Exemplary

Exemplary

Exemplary

Exemplary

Figure 5:
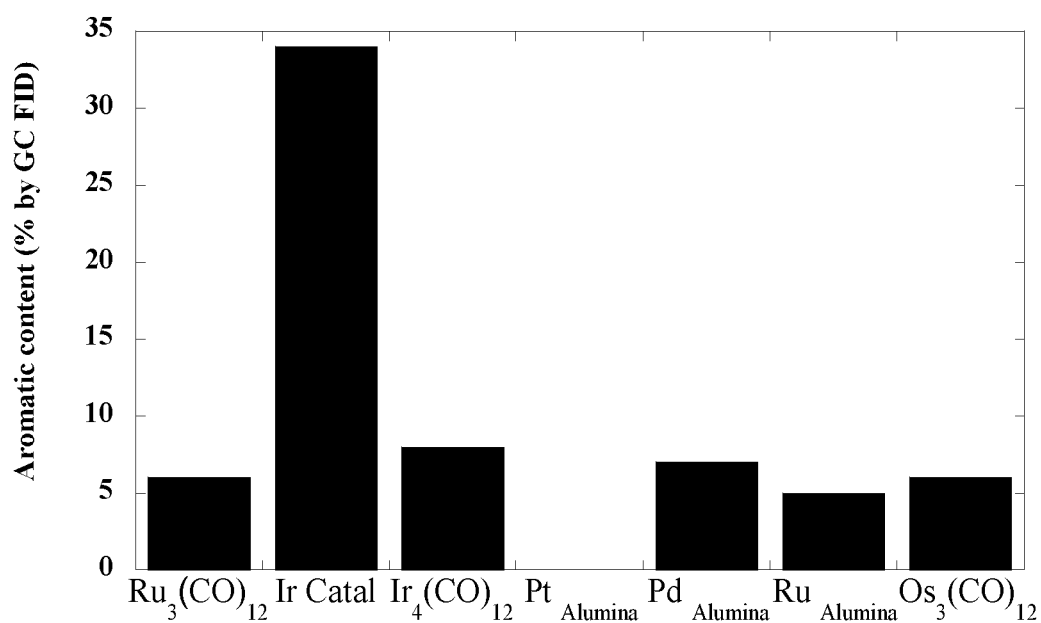

Exemplary FIG. 5 The aromatic content of the product of the decarboxylation of 9-cis-octadecenoic acid at 250° C. by 1 wt % of different catalyst: $Ru_3(CO)_{12}$, chloro-1,5-cyclooctadiene iridium (I) dimer, Iridium carbonyl, platinum on alumina, palladium on alumina, ruthenium on alumina, or $Os_3(CO)_{12}$ as described below.

DETAILED DESCRIPTION OF THE INVENTION

Disclosed herein are processes for the decarboxylation, isomerization, hydrogenation, dehydrogenation, and cyclization/aromatization of fatty acids involving contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein the catalyst is chloro-1,5-cyclooctadiene iridium (I) dimer. The product may contain at least about 8% by volume aromatic content (e g., at least 8%) and less than about 25% by volume aromatic content (e.g., less than 25%), and wherein the product contains less than about 1% by volume of naphthalenes (e.g., less than 1%).

As used in the specification and claims, the singular form "a", "an" and "the" include plural references unless the context clearly dictates otherwise.

Hereinafter, the present invention is explained in detail with reference to the following examples. The examples, however, should not in any sense be interpreted as limiting the scope of the present invention.

As used herein the term "alkene" or "olefin" refers to an unsaturated compound containing at least one carbon to carbon double bond. Examples of such include, but are not limited to any hydrocarbyl, hydrocarbyl aromatics, substituted or unsubstituted unsaturated fatty acids, unsaturated fatty esters, triglycerides, diol diesters, mono-esters, derivatives of olefins having been reacted under olefin metathesis processes such as cross metathesis, ring-opening metathesis, ring-closing metathesis, acyclic diene metathesis, ethenolysis, self-metathesis or derivatives of olefins having been polymerized.

As used herein, the term "fatty acid" is to be understood in this specification as a long chain carboxylic acid having at least six carbon atoms. Fatty acids may be saturated or unsaturated compounds. These compounds may contain linear or branched alkyl groups, for example, linear or branched alkyl groups having between six and thirty carbon atoms. Preferably fatty acids comprise one or more ethylenically unsaturated carbons in the alkyl chain and include hexenoic acid, heptenoic acid, octenoic acid, nonenoic acid, decenoic acid, undecenoic acid, undecylenic acid, hendecenoic acid, dodecenoic acid, tridecenoic acid, tetradecenoic acid, myristoleic acid, myristelaidic acid, pentadecenoic acid, hexadecenoic acid, palmitoleic acid, palmelaidic acid, heptadecenoic acid, octadecenoic acid, petroselinic acid, petroselaidic acid, oleic acid, elaidic acid, vaccenic acid, ricinoleic acid, ricinelaidic acid, nonadecenoic acid, eicosenoic acid, gondoic acid, heneicosenoic acid, docosenoic acid, erucic acid, brassidic acid, tricosenoic acid, tetracosenoic acid, nervonic acid, linoleic acid, lineladic acid, conjugated linoleic acid, linolenic acid, gamma linolenic acid, eicosadienoic acid, homogamma linolenic acid, eicosatrienoic acid, eicosatetranoic acid, arachidonic acid, eicosapentaenoic acid (EPA), docosadienoic acid, docosatrienoic acid, docosatetraenoic acid, docosapentaenoic acid, and docosahexaenoic acid (DHA).

As used herein, the term "fatty acid derivative" is to be understood in this specification as any compound comprising one or more groups derived from fatty acids. Examples of fatty acid derivatives are salts of fatty acids, for example: carboxylate salts, alkali salts, esters of fatty acids, preferably fatty acid ester group containing lipids, such as fatty acid ester group containing glycerolipids, fatty acid ester group containing glycerophospholipids, fatty acid ester group containing sphingolipids, fatty acid ester group containing sterol lipids, fatty acid ester group containing saccharolipids, and fatty acid ester group containing polyketides. Preferred fatty acid derivatives include octadecenoic acid, cinnamic acid, undecenoic acid, hexadecenoic acid, and hydroxy-octadecenoic acid.

As used herein, the term "recovering" as used in the context of recovering includes: crystallization, distillation, reactive distillation, extrusion, decanting, extraction, microfiltration, nanofiltration, or such techniques that are known to those skilled in the art. What is recovered in the processes described herein is a decarboxylated, isomerized, hydrogenated, dehydrogenated, and/or cyclized/aromatized product.

The disclosed process utilizes a chloro-1,5-cyclooctadiene iridium (I) dimer (Ir 1,5 COD dimer) catalyst.

The olefin decarboxylation, isomerization, hydrogenation, dehydrogenation, and cyclization/aromatization process of this invention using the chloro-1,5-cyclooctadiene iridium (I) dimer catalyst may be conducted at temperatures in the range of about 90° C. to about 350° C. (e.g., 90° C. to 350° C.), preferably in the range of about 150° C. to about 300° C. (e.g., 150° C. to 300° C.), and more preferably in the range of about 175° C. to about 225° C. (e.g., 175° C. to 225° C.). The decarboxylation process is typically conducted in an inert atmosphere (e.g., under nitrogen, argon, or in the presence of other gases such as hydrogen, carbon dioxide, carbon monoxide, and ethylene). The process is typically conducted at atmospheric pressure (about 1.0 bars (e.g., 1 bars)) but may be conducted at any manageable pressure typically in the range of about 0.1 to about 50 bars (e.g., 0.1 to 50 bars), and preferably in the range of about 0.5 bars to about 5.0 bars (e.g., 0.5 bars to 5.0 bars). The process may be conducted for about 2 to about 72 hours (e.g., 2 to 72 hours), and preferably in the range of about 4 to about 24 hours (e.g., 4 to 24 hours). The reaction may be carried out at pressures which are subatmospheric, atmospheric or superatmospheric. In some situations, reactions can also be conducted under vacuum such as in a distillation apparatus. Generally the reaction pH is about 2 to about 7 (e.g., 2 to 7), preferably about 3 to 5 (e.g., 3-5). The unsaturated organic compound product generally contains at least about 8% by volume (e.g., at least 8% by volume), preferably at least about 12% (e.g., at least 12%), more preferably at least about 16% (e.g., at least 16%)) aromatic content and less than about 40% by volume (e.g., less than 40%), preferably less than about 30% (e.g., less than 30%), more preferably less than about 25% (e.g., less than 25%)) aromatic content. The product contains less than about 1% by volume (e.g., less than 1%), preferably less than about 0.1% (e.g., less than 0.1%)) of naphthalenes.

The amount of the iridium catalyst useful for effecting the decarboxylation reaction is not narrowly critical. The typical amount is a catalytically effective amount, that is, an amount which is sufficient to affect the desired decarboxylation. For example, it has been established that iridium catalyst concentrations ranging roughly from about 0.05 to about 50,000 parts per million (ppm) (e.g., 0.05 to 50,000 ppm) iridium based on the weight of the liquid phase reaction medium can be used to affect the reaction. It is believed that larger and smaller amounts of the catalyst may be used to affect the reaction. The most preferred range is from about 0.5 to about 5,000 ppm iridium (e g., 0.5 to 5,000 ppm), same basis.

"Optional" or "optionally" means that the subsequently described event or circumstance may or may not occur, and that the description includes instances in which said event or circumstance occurs and instances where it does not. For example, the phrase "optionally adding a second catalyst" means that the method may or may not involve adding a second catalyst (e.g., Ru, Os) and that this description includes methods that involve and do not involve adding a second catalyst.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials: The catalyst triruthenium dodecacarbonyl ($Ru_3(CO)_{12}$ was purchased from Strem Chemical, Newburyport, Mass. (99%). The following were also purchased from Strem Chemical, Newburyport, Mass.: chloro-1,5-cyclooctadiene iridium (I) dimer(98%), bis(1,5-cyclooctadiene) diiridium(I) dichloride(99%), (1,5-cyclooctadiene)(methoxy)iridium(I)dimer(99%), diiodo(pentamethylcyclopentadienyl)iridium(III) dimer (99%). Iridium carbonyl Strem Chemical, Newburyport, Mass. (99%), Ru on alumina (Millipore-Sigma, St. Louis, Mo., 5% metal) Pd on alumina (Millipore-Sigma, St. Louis, Mo., 5% metal) were used as received, octadecanoic acid (stearic acid, Nu-Chek Prep, Elysian, Minn., >99%), 9-cis-octadecenoic acid (oleic acid, Nu-Chek Prep, Elysian, Minn., >99%), were also used as received. Soybean oil (RBD grade, KIC Chemical, New Paltz, N.Y.), and High Oleic Soybean Oil (Plenish, Dupont Pioneer (Corteva Agriscience), Johnston, Iowa) were converted to fatty acids using the method of Theodorou (Theodorou, V. et al., Tetrahedron Letters, 48: 8230-8233 (2007)). Generally, each of the oils was stirred with sodium hydroxide in 10% methanol/90% dichloromethane solvent at 50° C. for 4 hours. The solutions were cooled to give the products as fine precipitates, which were collected by filtration, rinsed with methanol/dichloromethane, and dried at 40° C. in a vacuum oven overnight. The product was dissolved in water and hydrochloric acid was added until a pH of 2 was reached, at which time the crude fatty acid product formed a precipitate. Heptane was added to dissolve the precipitate, then separated from the water layer. This heptane solution was removed by rotary evaporation to give pure fatty acid products.

Instruments: In all examples conversion was determined using an Agilent (Santa Clara, Calif.) model 7890A GC-FID with a DB35-MS (30 m×320 µm, 0.25 µm film) column. Relative response factors for alkanes, methyl esters, and carboxylic acids were calculated by comparison of authentic samples. Identities of products were also verified by injection into a similar GC that was equipped with an electron impact MS detector.

Nuclear Magnetic Resonance (NMR) spectra were taken in $CDCl_3$ at 500 MHz for $^1H$ and 125 MHz for $^{13}C$ using a Bruker Avance-500 spectromoter (Billerica, Mass.) equipped with a 5 mm dual probe. Gross calorific value was measured using an IKA C2000 automated bomb calorimeter (Wilmington, N.C.) with a D-Neslab RTE 7.0 cooler (23.5° C.) and paraffin ignition strips, according to ASTM method 5468-02 (2007). Samples were placed in capsules and complete combustion of the samples was observed without the use of a combustion aid. Triplicate measurements gave standard deviations of less than 0.6 MJ/kg in all cases. The instrument was calibrated with benzoic acid as specified in the method.

Reactions: Samples of ~2 g were decarboxylated at temperatures from 200-300° C. for 4 hours in 16×150 mm culture tubes that were sealed with a septa-capped lids. Most reactions utilized ~20 mg of catalyst and were prepared in an inert-atmosphere glovebox and connected to a Schlenk line through a 22 gauge needle. Aliquots of the reaction products were analyzed by chromatography and spectroscopy as described above.

Figure 1:
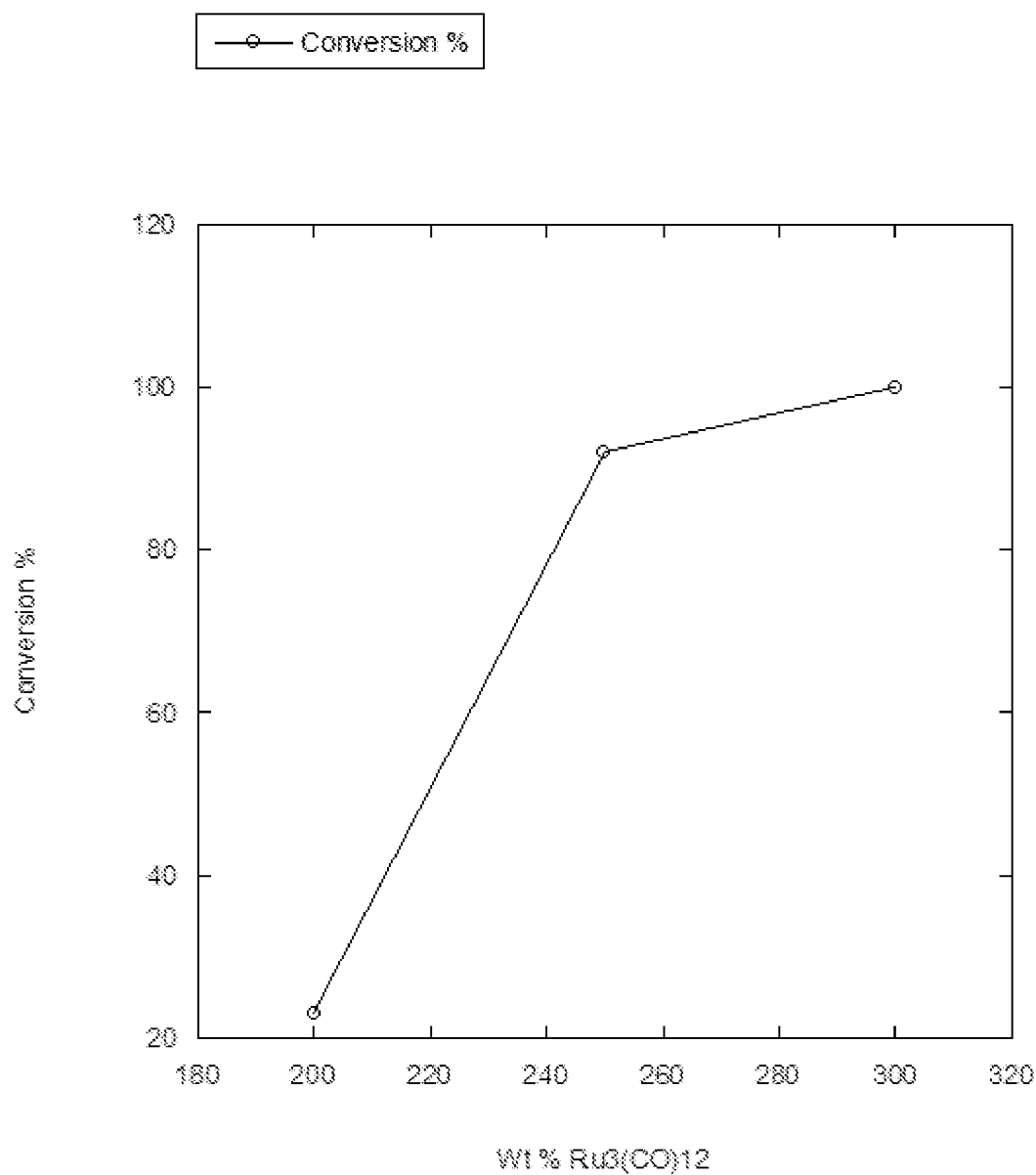
FIG. 1 shows the decarboxylation of 9-cis-octadecenoic acid by 1 wt % $Ru_3(CO)_{12}$ at different temperatures as described below.
Figure 2:
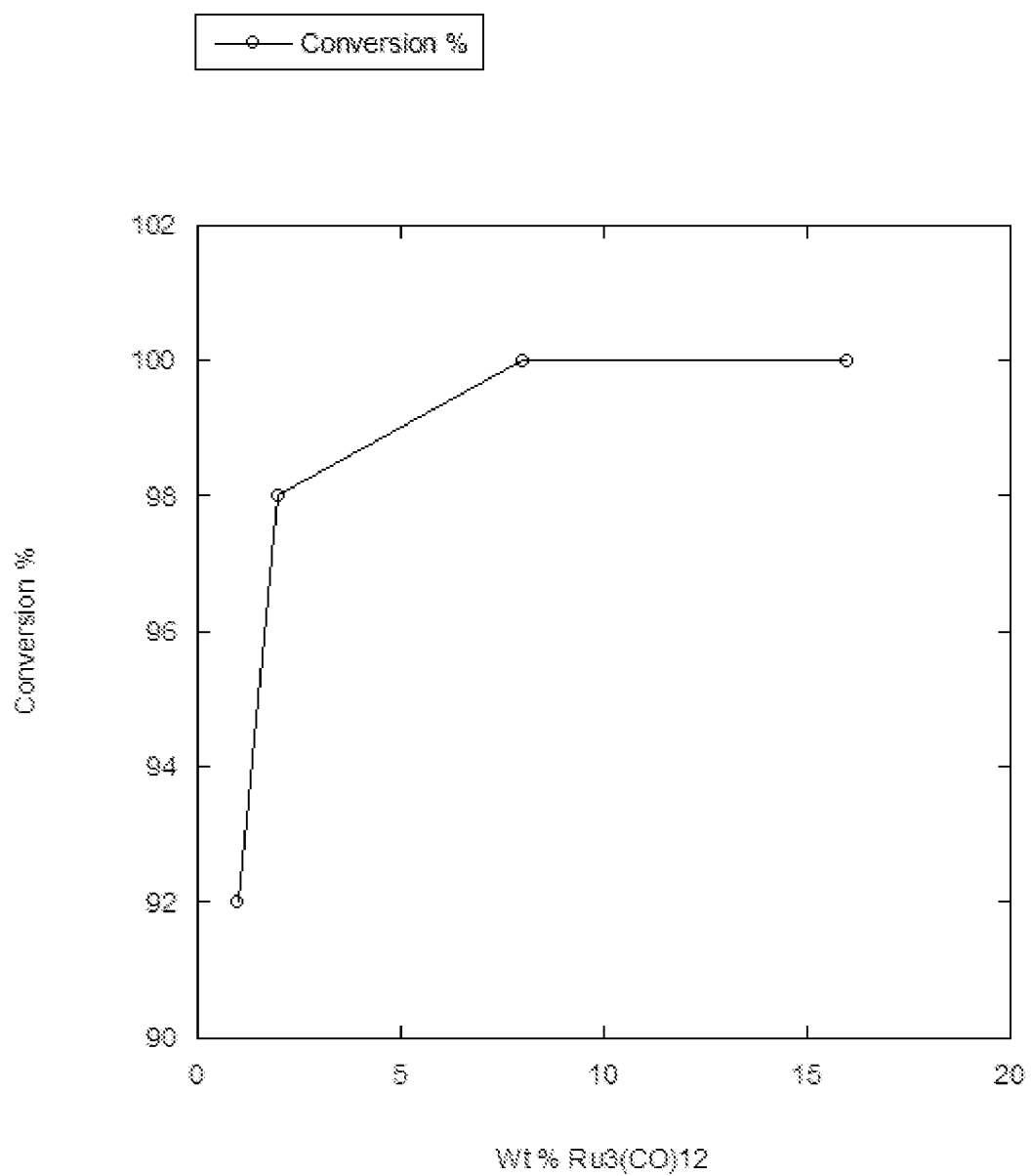
FIG. 2 shows the decarboxylation of 9-cis-octadecenoic acid at 250° C. by different wt % $Ru_3(CO)_{12}$ as described below.

Results and Discussion: The decarboxylation of oleic acid was performed in glass culture tubes using triruthenium dodecacarbonyl ($Ru_3(CO)_{12}$) with a focus on the overall conversion and the aromatic content of the resultant product. The conversion results were similar to previous studies (Knothe et al. 2017); conversion was low at 200° C. but consistently over 90% at 250° C., and complete at 300° C. (FIG. 1). Utilizing 250° C., high conversion was noted at ~1% catalyst loading, which could be brought to complete conversion with the addition of more catalyst (FIG. 2). As was discussed in the earlier work (Knothe et al. 2017) (Scheme 1), dehydrogenation is required to form aromatic products, which may also convert some of the substrate or unsaturated product into saturated materials. This series of experiments again demonstrated that increased alkane production surprisingly correlated with higher aromatics content. This is possibly evidence of a disproportionation reaction where a single compound of intermediate oxidation state is converted into two products, one of higher and the other of lower oxidation state. In the context of this work, the alkene is converted into both an alkane (reduced, i.e., lower oxidation state) and polyenes including aromatics (oxidized, i.e., higher oxidation state).

Figure 3:
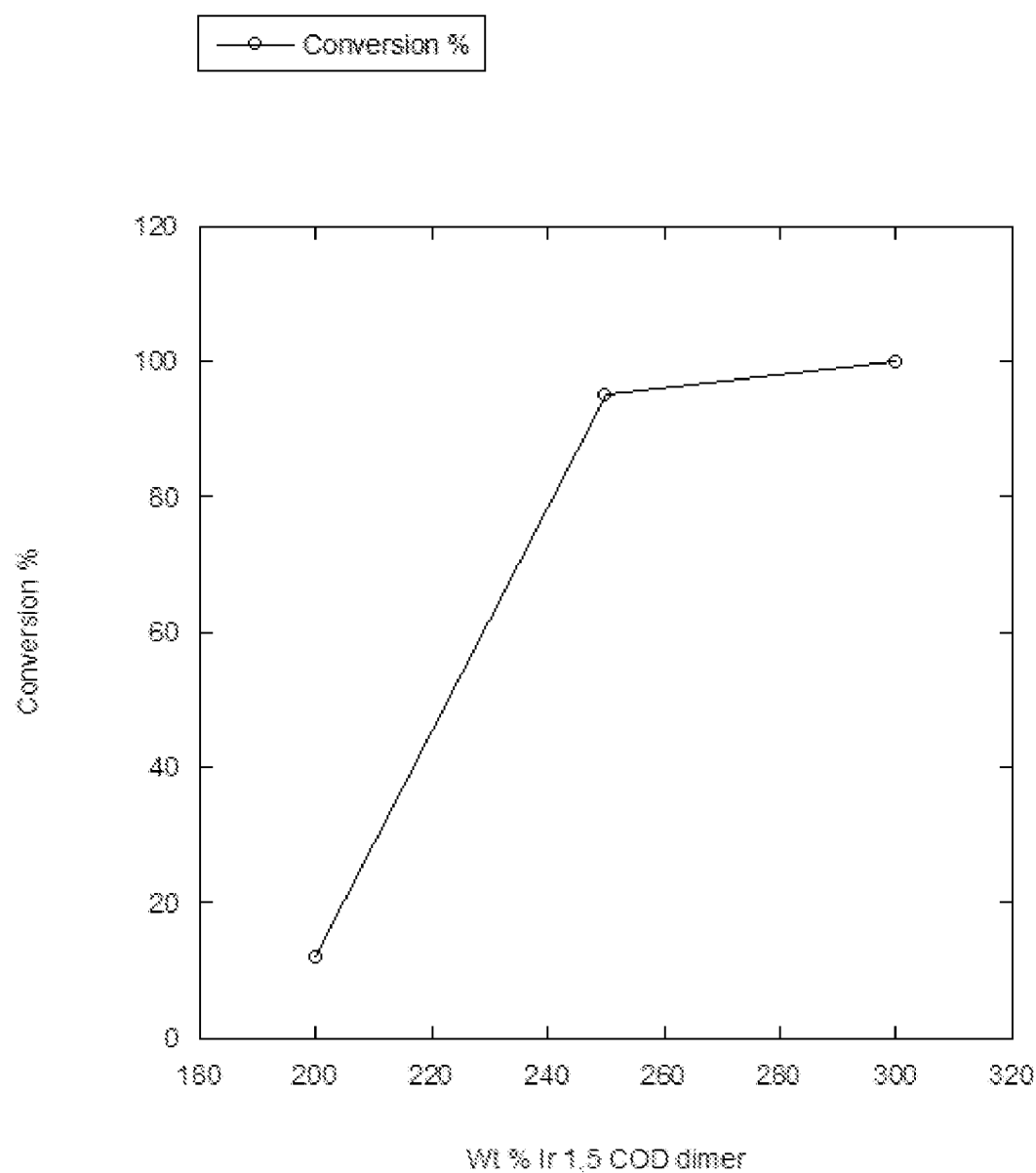
FIG. 3 shows the decarboxylation of 9-cis-octadecenoic acid by 1 wt % chloro-1,5-cyclooctadiene iridium (I) dimer at different temperatures as described below.
Figure 4:
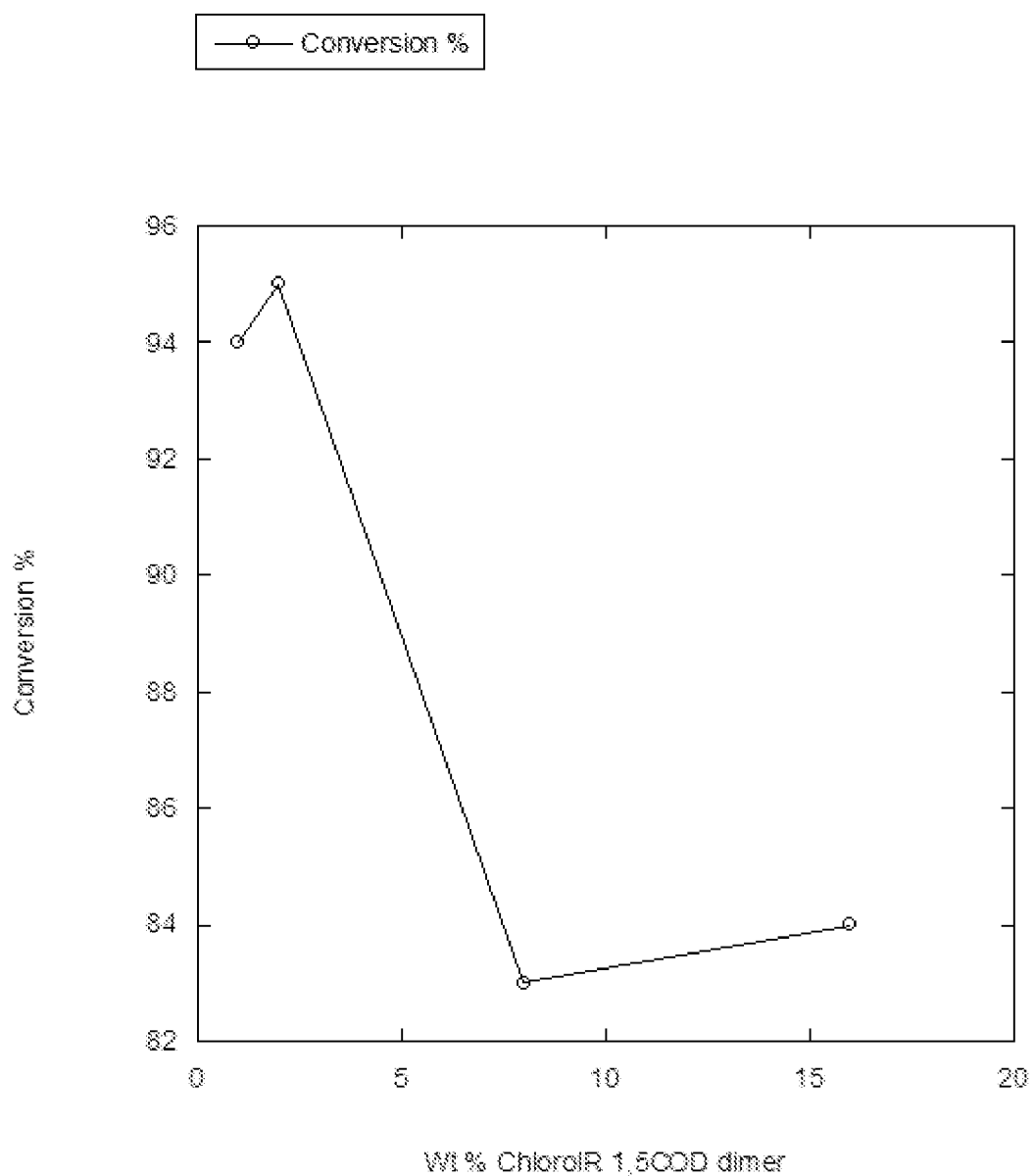
FIG. 4 shows the decarboxylation of 9-cis-octadecenoic acid at 250° C. by different wt % chloro-1,5-cyclooctadiene iridium (I) dimer as described below.

In order to achieve more aromatic content, catalysts known to be more active in hydrogen reactions were selected. However, heterogeneous platinum (Pt) on alumina, palladium (Pd) on alumina, and Ru on alumina, or combinations thereof, were surprisingly inactive toward decarboxylation. An initial selection of homogenous Ir catalysts was surprisingly not more fruitful, where Ir carbonyl, (1,5-cyclooctadiene)(methoxy)iridium(I)dimer, bis(1,5-cyclooctadiene) diiridium(I) dichloride, diiodo(pentamethylcyclopentadienyl)iridium(III) dimer, either displayed low conversion, <25%, or displayed obvious metal precipitation early in the reaction. However, chloro-1,5-cyclooctadiene Ir (I) dimer (Ir 1,5 COD dimer) was surprisingly effective under conditions similar to the Ru systems (FIG. 3, FIG. 4). More importantly, aromatic content surprisingly increased dramatically (FIG. 5), with a highest value of 34.9%. The same decarboxylation reactions were performed on soybean oil fatty acids and high oleic soybean oil fatty acids. The high oleic soybean oil fatty acids surprisingly gave a product distribution similar to that of oleic acid, with a 68% yield and observed aromatic content of 28.7% with Ir catalyst, compared to 81% yield with only 6% aromatic content using Ru. The soybean oil fatty acids surprisingly formed a lower yield of product, 33% of which 8.1% was aromatic with Ir, and only 6% yield with no aromatic content when Ru was used.

Conclusion: Our work focused on the conversion of oleic acid into a fuel component by decarboxylation. The use of a specific Ir catalyst instead of the precedented Ru gave conversion, but surprisingly also a product containing higher aromatic content. Surprisingly this higher aromatic content will allow different blend ratios with petroleum based fuels; the fuel also had no detectible level of napthalenes, <1%. Scheme 2 shows the reactions involved:

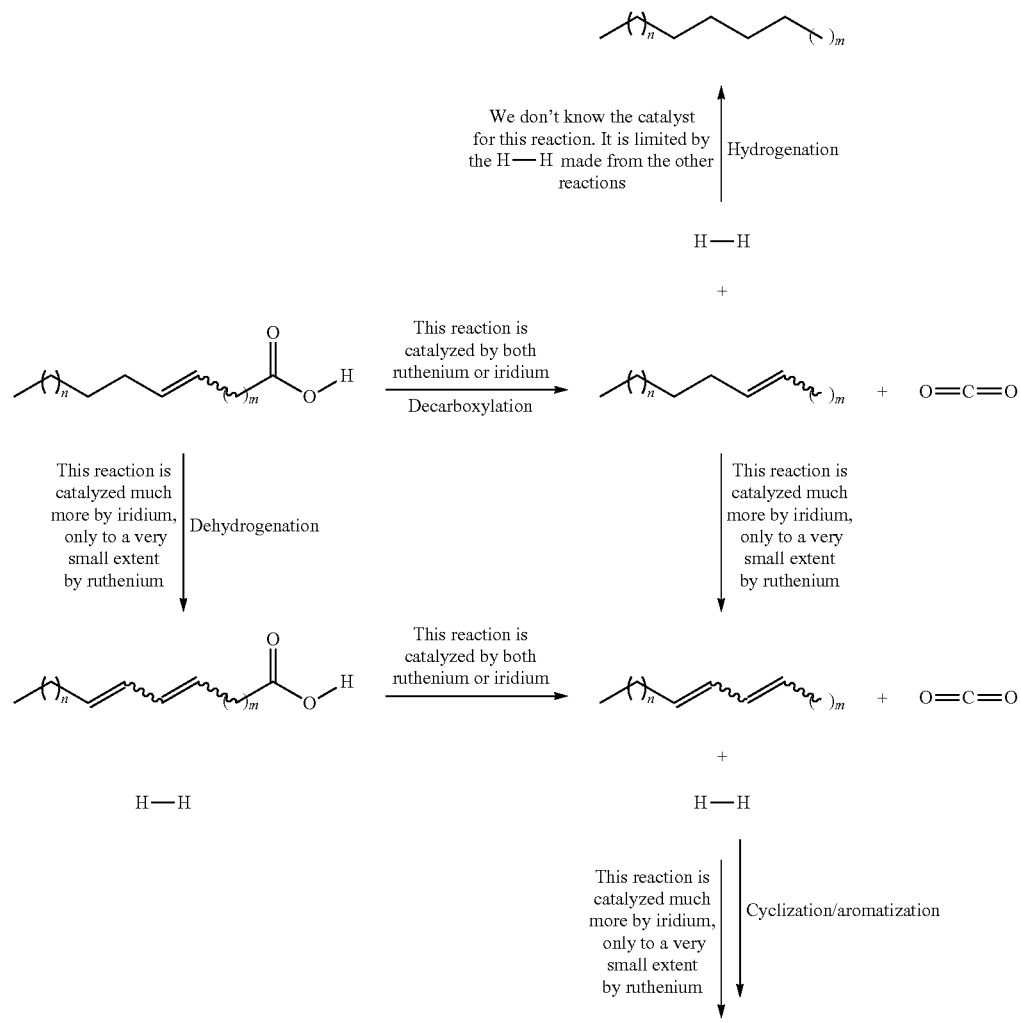

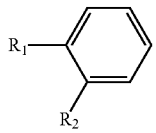

All of the references cited herein, including U.S. Patents and U.S. Patent Application Publications, are incorporated by reference in their entirety. Also incorporated by reference in their entirety are the following references: Maetani, S., et al., Organometallics, 30: 1389-1394 (2011); Caulton, K. G., et al., Proceedings of the National Academy of Sciences, 73: 4274-4276 (1976); Ray, A., et al., Chemical Communications, 3388-3390 (2005).

Thus, in view of the above, there is described (in part) the following:

A process for the decarboxylation, isomerization, hydrogenation, dehydrogenation, and cyclization/aromatization of fatty acids, said process comprising (or consisting essentially of or consisting of) contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein said catalyst is chloro-1,5-cyclooctadiene iridium (I) dimer.

The above process, wherein said product contains at least about 8% by volume aromatic content and less than about 25% by volume aromatic content, and wherein said product contains less than about 1% by volume of naphthalenes. The above process, wherein said product contains at least about 8% by volume aromatic content and less than about 25% by volume aromatic content, and wherein said product contains less than about 0.1% by volume of naphthalenes.

The above process, wherein said starting material is a mixture of fatty acids.

The above process, wherein said starting material is soybean oil based fatty acids.

The above process, wherein said starting material is at least about 80% oleic soybean oil based fatty acids.

The above process, wherein said catalyst is chloro-1,5-cyclooctadiene iridium (I) dimer and at least one Ru catalyst.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence . . . . Silence in the specification may be used to establish written description support for a negative limitation. As an example, in Ex parte Lin [No. 2009-0486, at 2, 6 (B.P.A.I May 7, 2009)] the negative limitation was added by amendment . . . . In other words, the inventor argued an example that passively complied with the requirements of the negative limitation . . . was sufficient to provide support . . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A process for the decarboxylation, isomerization, hydrogenation, dehydrogenation, and cyclization/aromatization of fatty acids, said process comprising contacting a starting material which is an unsaturated fatty acid, unsaturated fatty acid derivative, or an unsaturated triglyceride, in the presence of a catalyst at a temperature at which decarboxylation, isomerization, hydrogenation, dehydrogenation, and cyclization/aromatization occurs and recovering the unsaturated organic compound product; wherein said catalyst is chloro-1,5-cyclooctadiene iridium (I) dimer.

2. The process according to claim 1, wherein said product contains at least about 8% by volume aromatic content and less than about 25% by volume aromatic content, and wherein said product contains less than about 1% by volume of naphthalenes.

3. The process according to claim 1, wherein said product contains at least about 8% by volume aromatic content and less than about 25% by volume aromatic content, and wherein said product contains less than about 0.1% by volume of naphthalenes.

4. The process according to claim 1, wherein said starting material is a mixture of fatty acids.

5. The process according to claim 1, wherein said starting material is soybean oil based fatty acids.

6. The process according to claim 1, wherein said starting material is at least about 80% oleic soybean oil based fatty acids.

7. The process according to claim 1, wherein said catalyst is chloro-1,5-cyclooctadiene iridium (I) dimer and at least one Ru catalyst.

* * * * *